United States Patent
Tanaka

(10) Patent No.: US 8,675,026 B2
(45) Date of Patent: Mar. 18, 2014

(54) IMAGE PROCESSING APPARATUS, IMAGE PROCESSING METHOD, AND COMPUTER PROGRAM STORAGE MEDIUM

(75) Inventor: Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 12/200,592

(22) Filed: Aug. 28, 2008

(65) Prior Publication Data

US 2009/0058886 A1    Mar. 5, 2009

(30) Foreign Application Priority Data

Aug. 29, 2007  (JP) ................................ 2007-223124

(51) Int. Cl.
*G09G 5/00*  (2006.01)
(52) U.S. Cl.
USPC ........................................................ 345/682
(58) Field of Classification Search
USPC ................................... 345/539, 521; 348/714
See application file for complete search history.

(56) References Cited

U.S. PATENT DOCUMENTS

| 5,584,004 | A  | * | 12/1996 | Aimoto et al. ..................... 711/5 |
| 6,597,364 | B1 | * | 7/2003  | Chiu et al. ...................... 345/562 |
| 6,885,377 | B2 | * | 4/2005  | Lim et al. ....................... 345/539 |
| 2006/0170762 | A1 | | 8/2006 | Tanaka et al. |
| 2007/0030260 | A1 | * | 2/2007 | Yano ............................. 345/204 |
| 2007/0046679 | A1 | | 3/2007 | Tanaka |
| 2008/0013504 | A1 | | 1/2008 | Nishibayashi et al. |
| 2008/0101477 | A1 | | 5/2008 | Goto et al. |
| 2008/0117285 | A1 | | 5/2008 | Tanaka |

FOREIGN PATENT DOCUMENTS

JP    2006-285302    10/2006

OTHER PUBLICATIONS

S. Tanaka, et al., "Image Generating Apparatus, Image Generating Method, and Computer Readable Medium", U.S. Appl. No. 12/169,169, filed Jul. 8, 2008.

* cited by examiner

*Primary Examiner* — Ke Xiao
*Assistant Examiner* — Kyle Zhai
(74) *Attorney, Agent, or Firm* — Finnegan, Henderson, Farabow, Garrett & Dunner, L.L.P.

(57) ABSTRACT

There is provided an image processing apparatus including: a storage which stores image data of one frame; an image receiving unit which receives image data on an area of all or a part of the one frame; an image writing unit which writes the image data received by the image receiving unit into the storage; an image reading unit which periodically reads the image data of the one frame from the storage in a predetermined order of address; an image output unit which outputs the image data read by the image reading unit; a copy instruction receiving unit which receives a copy instruction which specifies address information of a copy source area to be copied in the one frame in the first image storage, and which specifies address information of a copy destination area in which image data copied from the copy source area is to be placed; and a copy image writing unit which, when an address of the image data read by the image reading unit is included in the address information of the copy source area, writes the image data read by the image reading unit in the address included in the address information of the copy source area into the storage on the basis of the address information of the copy destination area.

9 Claims, 14 Drawing Sheets

IMAGE PROCESSING APPARATUS, IMAGE PROCESSING METHOD, AND COMPUTER PROGRAM STORAGE MEDIUM

CROSS REFERENCE TO RELATED APPLICATIONS

This application is based upon and claims the benefit of priority from the prior Japanese Patent Applications No. 2007-223124, filed on Aug. 29, 2007; the entire contents of which are incorporated herein by reference.

BACKGROUND OF THE INVENTION

1. Field of the Invention

The present invention relates to an image processing apparatus, an image processing method, and a computer program storage medium, which is once store image data in a storage device, and to periodically read the stored image data, so as to generate image data.

2. Related Art

There is a thin client system configured in a form in which only user interfaces, such as a display, a mouse and a keyboard of a PC (Personal Computer) or a workstation, are placed as terminals at the hand of a user, and a computer main body having arithmetic capability is placed beyond a network. The thin client system need not be configured to prepare a plurality of computers for multiple users as before, but is configured to prepare only a plurality of terminals for the users and to prepare a computer main body capable of receiving the plurality of terminals. As a result the total costs of the system can be reduced. Further, the maintainability of the system can be improved by collectively managing the computer main body.

A display screen requires pixel information of a wide band, and hence sufficient transmission speed cannot be obtained in the general communication. Thus, at the time of transmitting a screen, it is necessary to compress the image data. As a method for compressing a moving picture, the MPEG (Moving Picture Experts Group), and the like, is well known. However, in the case of a personal computer screen, the update frequency of a generated screen is low, and an area to be updated is often locally limited in the screen. Thus, the processing configured, at the time when the update is generated, to compress and transmit only a partial image of the area for which the update is generated, is more efficient as compared with the processing in which the whole screen is simply compressed for each frame similarly to the case of a moving picture. For example, when a window appears in a part of the screen as shown in FIG. 16, only the image of the window is extracted (dotted line portion in FIG. 16), and the compressed image data of the window and the position coordinates on the screen where the window is displayed are transmitted. On the receiving terminal side, a desired screen can be obtained as shown in FIG. 17 in such a way that the compressed image data is first expanded and the expanded image is pasted at a position corresponding to the received position coordinates.

Further, there is considered a case where the window is moved by a mouse drag, or the like. In this case, a position after the movement is first specified. Then, the compressed image of the window which is the same as that in the above case is transmitted, so that the window can be displayed at the position after the movement (the left side in FIG. 18). However, the remainder of the window before the movement is left if nothing is done. Thus, the position coordinates of the position of the window before the movement is specified, and the background image is transmitted so as to be overwritten on the remainder of the window. Thereby, the movement of the window can be expressed (the right side in FIG. 18). Such technique of transmitting a screen is disclosed in, for example, JP-A 2006-285302 (Kokai).

However, when a window is moved, an image (in this case, a window image) which is already displayed on the screen is transmitted. The image is already stored in a frame buffer on the reception side, and hence the image essentially need not be transmitted again. Thus, the transmission of the image can be simply omitted by using a copy instruction of copying a part of the screen to another area. That is, the copy instruction in which the original position and size of the window and the position of the movement destination are respectively set as the position and size of the copy source and the position of the copy destination, is issued and transmitted from the transmission side. On the terminal side, upon receipt of the copy instruction, an area corresponding to the position and size which are specified as those of the copy source is read from the frame buffer, and the read image is written at the position of the copy destination. Thereby, the window image after the movement can be obtained. The subsequent processing of overwriting the background image on the remainder of the window before the movement is as the same as the above described processing.

In this way, it is possible to omit the transmission of the image displayed on the screen by using the copy instruction. However, in this case, the transmission of the image is omitted but the processing for reading the image from the frame buffer is added. The access to the frame buffer is, for example, a memory access to a SDRAM, and hence not a small amount of electric power is consumed.

SUMMARY OF THE INVENTION

According to an aspect of the present invention, there is provided an image processing apparatus comprising:

a first image storage configured to store image data of one frame;

an image receiving unit configured to receive image data on an area of all or a part of the one frame;

an image writing unit configured to write the image data received by the image receiving unit into the first image storage;

an image reading unit configured to periodically read the image data of the one frame from the first image storage in a predetermined order of address;

an image output unit configured to output the image data read by the image reading unit;

a copy instruction receiving unit configured to receive a copy instruction which specifies address information of a copy source area to be copied in the one frame in the first image storage, and which specifies address information of a copy destination area in which image data copied from the copy source area is to be placed; and a copy image writing unit configured, when an address of the image data read by the image reading unit is included in the address information of the copy source area, to write the image data read by the image reading unit in the address included in the address information of the copy source area into the first image storage on the basis of the address information of the copy destination area.

According to an aspect of the present invention, there is provided an image processing apparatus comprising:

a first image storage configured to store image data of one frame;

an image receiving unit configured to receive image data on an area of all or a part of the one frame;

an image writing unit configured to write the image data received by the image receiving unit into the first image storage;

an image reading unit configured to periodically read the image data of the one frame from the first image storage in a predetermined order of address;

an image output unit configured to output the image data read by the image reading unit;

a copy instruction receiving unit configured to receive a copy instruction which specifies address information of a copy source area to be copied in the one frame in the first image storage, and which specifies address information of a copy destination area in which image data copied from the copy source area is to be placed;

a read address conversion instruction unit configured to instruct the image reading unit to read image data from the image source area instead of the copy destination area when an address of the image to be read by the image reading unit is included in the address of the copy destination area; and a copy image writing unit configured to write the image data read from the copy source area instead of the copy destination area by the image reading unit into the copy destination area.

According to an aspect of the present invention, there is provided an image processing method comprising:

receiving image data on an area of all or a part of an one frame;

writing the received image data into a first image storage which stores image data of one frame;

periodically reading the image data of the one frame from the first image storage in a predetermined order of address;

outputting the read image data;

receiving a copy instruction which specifies address information of a copy source area to be copied in the one frame in the first image storage, and which specifies address information of a copy destination area in which image data copied from the copy source area is to be placed; and when an address of the read image data is included in the address information of the copy source area, writing the read image data in the address included in the address information of the copy source area into the first image storage on the basis of the address information of the copy destination area.

According to an aspect of the present invention, there is provided an image processing method comprising:

receiving image data on an area of all or a part of an one frame;

writing the received image data into a first image storage which stores image data of one frame;

periodically reading the image data of the one frame from the first image storage in a predetermined order of address;

outputting the read image data;

receiving a copy instruction which specifies address information of a copy source area to be copied in the one frame in the first image storage, and which specifies address information of a copy destination area in which image copied from the copy source area is to be placed;

controlling to read the image data from the image source area instead of the copy destination area when an address of the image to be read is included in the address of the copy destination area; and writing the image data read from the copy source area instead of the copy destination area into the copy destination area.

According to an aspect of the present invention, there is provided a non-transitory computer program readable medium having executable programming instructions stored thereon which, when executed by a computer, cause the computer to perform steps comprising:

receiving image data on an area of all or a part of an one frame;

writing the received image data into a first image storage which stores image data of one frame;

periodically reading the image data of the one frame from the first image storage in a predetermined order of address;

outputting the read image data;

receiving a copy instruction which specifies address information of a copy source area to be copied in the one frame in the first image storage, and which specifies address information of a copy destination area in which image data copied from the copy source area is to be placed; and when an address of the read image data is included in the address information of the copy source area, writing the read image data in the address included in the address information of the copy source area into the first image storage on the basis of the address information of the copy destination area.

According to an aspect of the present invention, there is provided a non-transitory computer readable medium having executable programming instructions stored thereon which, when executed by a computer, cause the computer to perform steps comprising:

receiving image data on an area of all or a part of an one frame;

writing the received image data into a first image storage which stores image data of one frame;

periodically reading the image data of the one frame from the first image storage in a predetermined order of address;

outputting the read image data;

receiving a copy instruction which specifies address information of a copy source area to be copied in the one frame in the first image storage, and which specifies address information of a copy destination area in which image copied from the copy source area is to be placed;

controlling to read the image data from the image source area instead of the copy destination area when an address of the image to be read is included in the address of the copy destination area; and writing the image data read from the copy source area instead of the copy destination area into the copy destination area.

DETAILED DESCRIPTION OF THE INVENTION

First Embodiment

Figure 1:
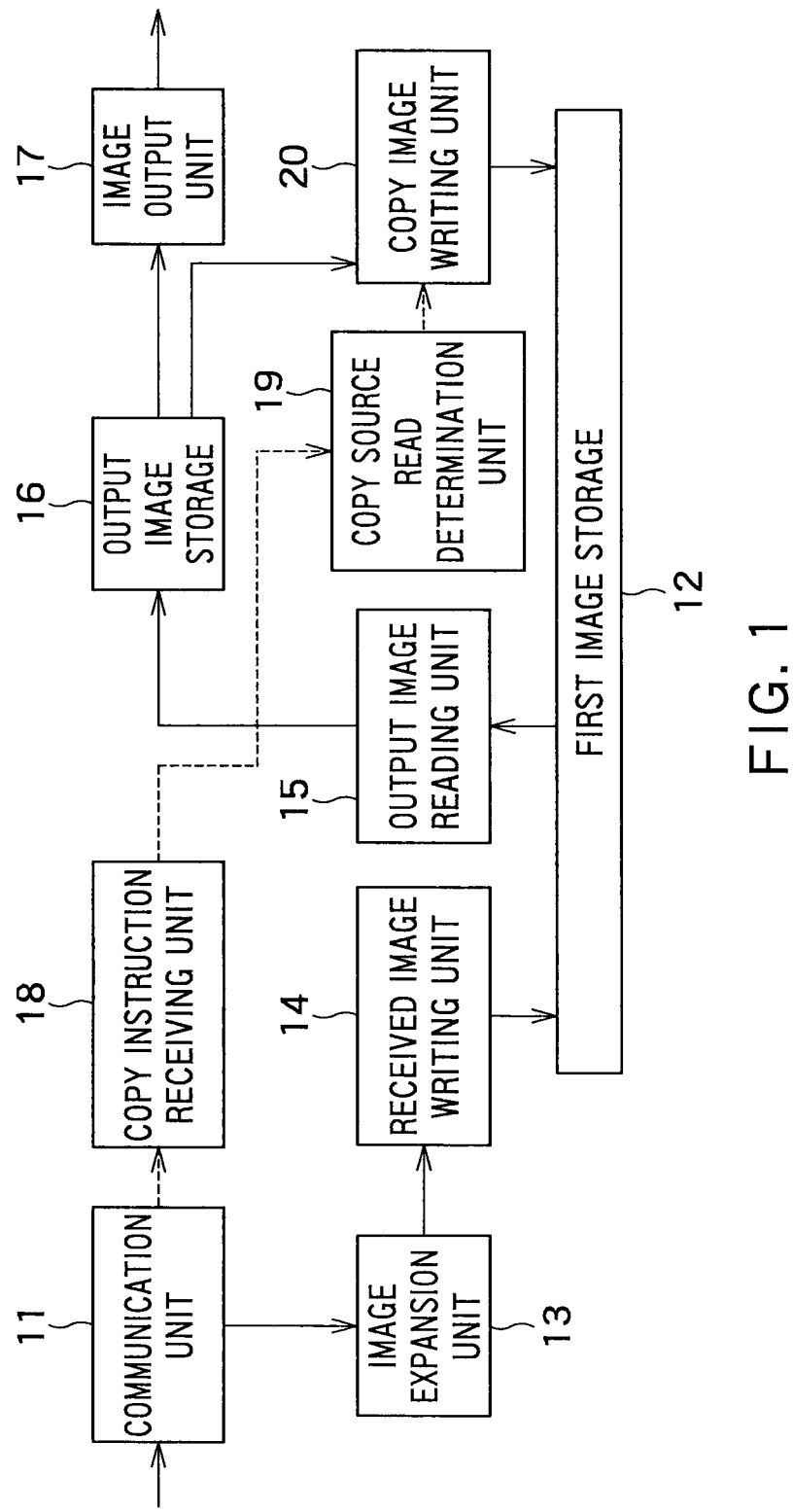
FIG. 1 is a block diagram showing an image processing apparatus as a first embodiment according to the present invention.

FIG. 1 shows a first embodiment according to the present invention. FIG. 1 shows an image processing apparatus configured to receive a compressed image from an image transmitter and to output the image to a display panel, and shows a configuration of a portion of the apparatus which portion relates to the present invention. The image processing apparatus is connected to the image transmitter and the display panel via a network, and the image transmitter and the display panel are placed as terminals at the hand of the user.

The image processing apparatus includes a communication unit (image receiving unit) 11 which communicates with the image transmitter, a first image storage 12 which stores an image frame to be outputted to a screen, an image expansion unit 13 which expands a compressed image received from the image transmitter, a received image writing unit (image writing unit) 14 which writes the expanded image into the first image storage 12, an output image reading unit (image reading unit) 15 which in order to output a stored image to a display panel, periodically reads the image, an output image storage 16 which temporarily stores the read image, and an image output unit 17 which outputs the stored image to the display panel for each area (for example, for each pixel). When it is assumed that the display panel has, for example, a resolution XGA (1024×768) and has 16 bit information per one pixel of RGB, the first image storage 12 is set to have an area for storing information of at least 12582912 (=1024× 768×16) bits.

The above described configuration is also included in the conventional image processing apparatus. The image processing apparatus according to the present invention further includes a copy instruction receiving unit 18 which receives a copy instruction, a copy source read determination unit 19 which determines, on the basis of the received copy instruction, whether or not an image of a copy source area is read by the output image reading unit 15, and a copy image writing unit 20 which when it is determined by the copy source read determination unit 19 that the image of the copy source area is read, receives the image of the copy source area from the output image storage 16, and writes the received image into a copy destination area of the first image storage 12.

Before describing the essential point of the present invention, there will be described specific operations from reception to output of an image which are also conventionally performed. First, a compressed image of an image to be displayed on a whole screen is transmitted from an image transmitter. The communication unit 11 receives the compressed image, and the image expansion unit 13 expands the compressed image. The received image writing unit 14 writes the expanded image in the first image storage 12. On the other hand, the output image reading unit 15 reads the image by one line at a time for each fixed period, and the output image storage 16 stores the read line. Further, on the other hand, the image output unit 17 reads the image stored in the output image storage 16 for each pixel at a fixed timing and outputs the read image to the display panel.

Figure 7:
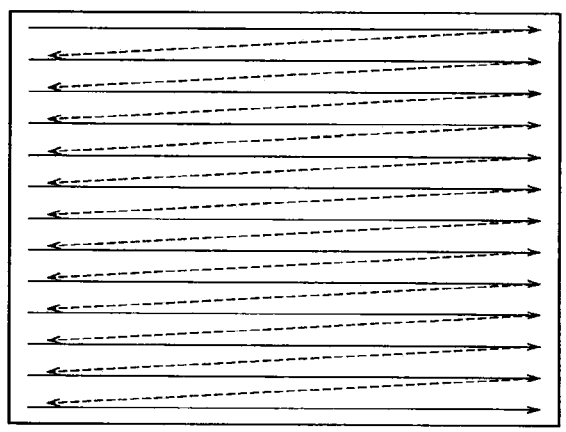
FIG. 7 is a figure showing a state in which an image frame is read for each pixel in the order of address specified beforehand.

The image output operation will be described in more detail. Generally, the display panel requires that image pixel data from the upper left to the lower right of the screen is inputted at a fixed timing in the order (in an address sequence defined beforehand) as shown in FIG. 7. As for the timing, in the case of a display panel which displays an image, for example, at 60 Hz, the pixels of the whole screen need to be inputted in such a manner that a round of input operations is completed in 1/60 seconds. Note that in addition to the input period, there exists a blank period in which no pixel is outputted. However, the blank period is unrelated to the present invention, and hence the description thereof is omitted.

Here, the first image storage 12 which stores the image pixel data, also receives an access, such as a write access, other than the read access for image output. Thus, there may be a case where access arbitration of such accesses needs to be performed (not shown). In this case, the access to the first image storage 12 cannot be occupied only by the image output unit 17. In this case, in order to output an image, the image output unit 17 performs an operation in which a certain amount of data is read at the time when the read access to the first image storage 12 is possible, and in which while the read data is temporarily buffered, the buffered data is outputted at a timing required by the display panel. In the present embodiment, it is assumed that the certain amount of data is pixel data for one line, and that the data for one line is read by the output image reading unit 15 and the read data is buffered in the output image storage 16. When the image output unit 17 outputs the pixel data at the timing required by the display panel, the output image reading unit 15 reads the pixel data at a suitable timing so as to prevent a buffer underflow from occurring in the output image storage 16. Specifically, for example, when the image output unit 17 reads the n-th line from the output image storage 16 to output the read n-th line, the output image reading unit 15 reads the next (n+1)th line to store it in the output image storage 16 before the image output unit 17 starts to output the (n+1)th line. Then, when the image output unit 17 outputs the (n+1)th line pixel data, the data is already stored in the output image storage 16. Thus, the buffer underflow in the output image storage 16 is always prevented by repeating these operations, so that the image output unit 17 is able to correctly perform the image output operation.

Figure 8:
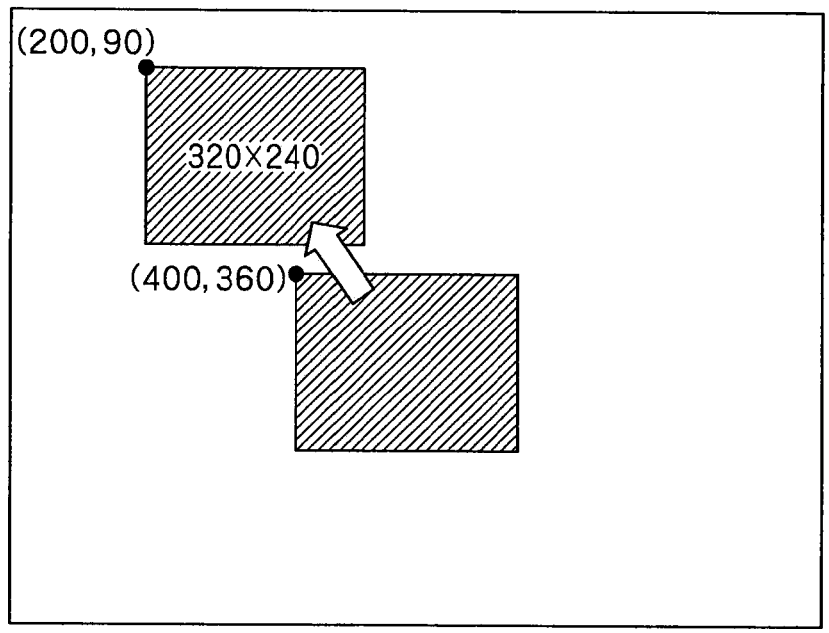
FIG. 8 is a figure for explaining a copy instruction.

The above described processing is the processing from reception to output of an image which is also conventionally performed. However, in the present invention, an operation of copying a part of the image frame area is further performed. Specifically, first, when the image transmitter transmits a copy instruction, the image processing apparatus receives the copy instruction by means of the copy instruction receiving unit 18 via the communication unit 11. The copy instruction includes, as copy information, the coordinates of copy source area, the coordinates of copy destination area, and the size of copy area. For example, in the case where copy processing as shown in FIG. 8 is performed, the coordinates of copy source area are set to (400, 360), the coordinates of copy destination area are set to (200, 90), and the size of copy area is set as 320×240. The set of the coordinates (400, 360) of copy source area and the size 320×240 of copy area correspond to, for example, the address information of copy source area, and the set of the coordinates (200, 90) of copy destination area and the size 320×240 of copy area correspond to, for example, the address information of copy destination area.

Figure 5:
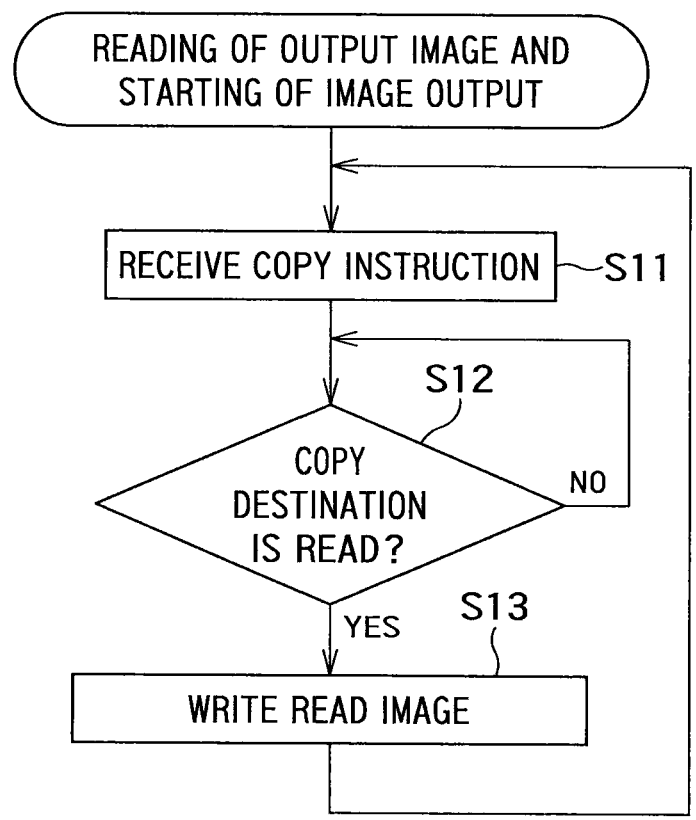
FIG. 5 is a flow chart showing a flow of operation according to the first embodiment.

Conventionally, when the above described copy processing is performed, a processing unit, which is provided for exclusively performing the copy processing, reads the image of the copy source area from the first image storage 12, and writes the read image in the copy destination area. However, in the present invention, the read processing of the copy processing is performed by utilizing the image reading operation performed by the output image reading unit 15 for image output. FIG. 5 shows a flow chart showing a flow of the operations according to the present embodiment.

Figure 9:
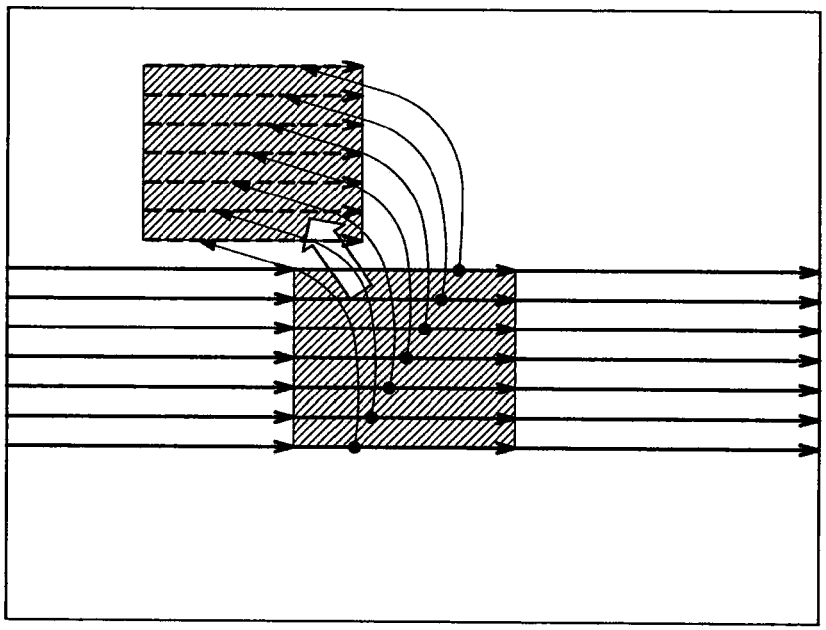
FIG. 9 is a figure showing a case where a copy source area is located in middle of the screen, and where a copy destination area is located in the upper left of the screen.

The copy instruction receiving unit 18 receives a copy instruction via the communication unit 11 (step S11). The copy source read determination unit 19 determines, on the basis of a read address, which area of the present image frame is read by the output image reading unit 15. That is, on the basis of the coordinates of the copy source area and the size of the copy source area of the copy instruction, the copy source read determination unit 19 determines that when the address read by the output image reading unit 15 is included in the copy source area, the read area of the present image frame is included in the copy source area (YES in step S12). According to the determination result, the copy image writing unit 20 writes the read copy source image of the output image storage 16 into the corresponding portion of the copy destination area in the first image storage 12 by referring to the coordinates of the copy destination area of the copy instruction (step S13). The state of the image frame becomes as shown in FIG. 9. FIG. 9 shows a case where the hatched area in the middle of the screen is the copy source area, and where the hatched area in the upper left of the screen is the copy destination area, and shows a state where when the copy source area is read by the output image reading unit 15, the read copy source area is written at the corresponding position of the copy destination area. Then, the image transmitter transmits the background image whose position coordinates are specified to be those of the image before the movement so that the background image is overwritten on the image of the copy source area, and the received image writing unit 14 writes the transmitted background image in the copy source area in the first image storage 12. Thereby, the movement of the image can be expressed.

Note that in the present embodiment, there is described a case where the output image reading unit 15 reads each line, and where the output image storage 16 stores the read each line, but the case is only an example. The reading and storing operations may be performed in any unit. Further, in the present embodiment, there is described a case where the access arbitration needs to be performed for the first image storage 12 at the time when the output image reading unit 15 performs a read access, but the case is only an example. The access arbitration need not be performed, and further the output image storage 16 may be eliminated. The present invention is featured in that it is determined on the basis of the copy instruction information of an image area whether or not the address periodically read by the output image reading unit 15 from the first image storage 12 is the address of a copy source area, and that when it is determined that the read address is the address of the copy source area, the read image is written in a copy destination area of the first image storage 12. Thus, the buffering is not necessarily needed between the reading and writing operations. However, the present invention can be more widely applied by providing a buffer (for example, the output image storage 16).

As described above, according to the present embodiment, it is configured such that when the address of an image read from the first image storage at the time of reading an image frame is included in a copy source area, the image is copied by being written into a copy destination area. Thereby, it is possible to eliminate the need of performing read access to an image buffer for copying the image. As a result, the memory access can be reduced, and hence the power consumption required for execution of the copy instruction (copy instruction information) can be reduced.

Second Embodiment

Figure 2:
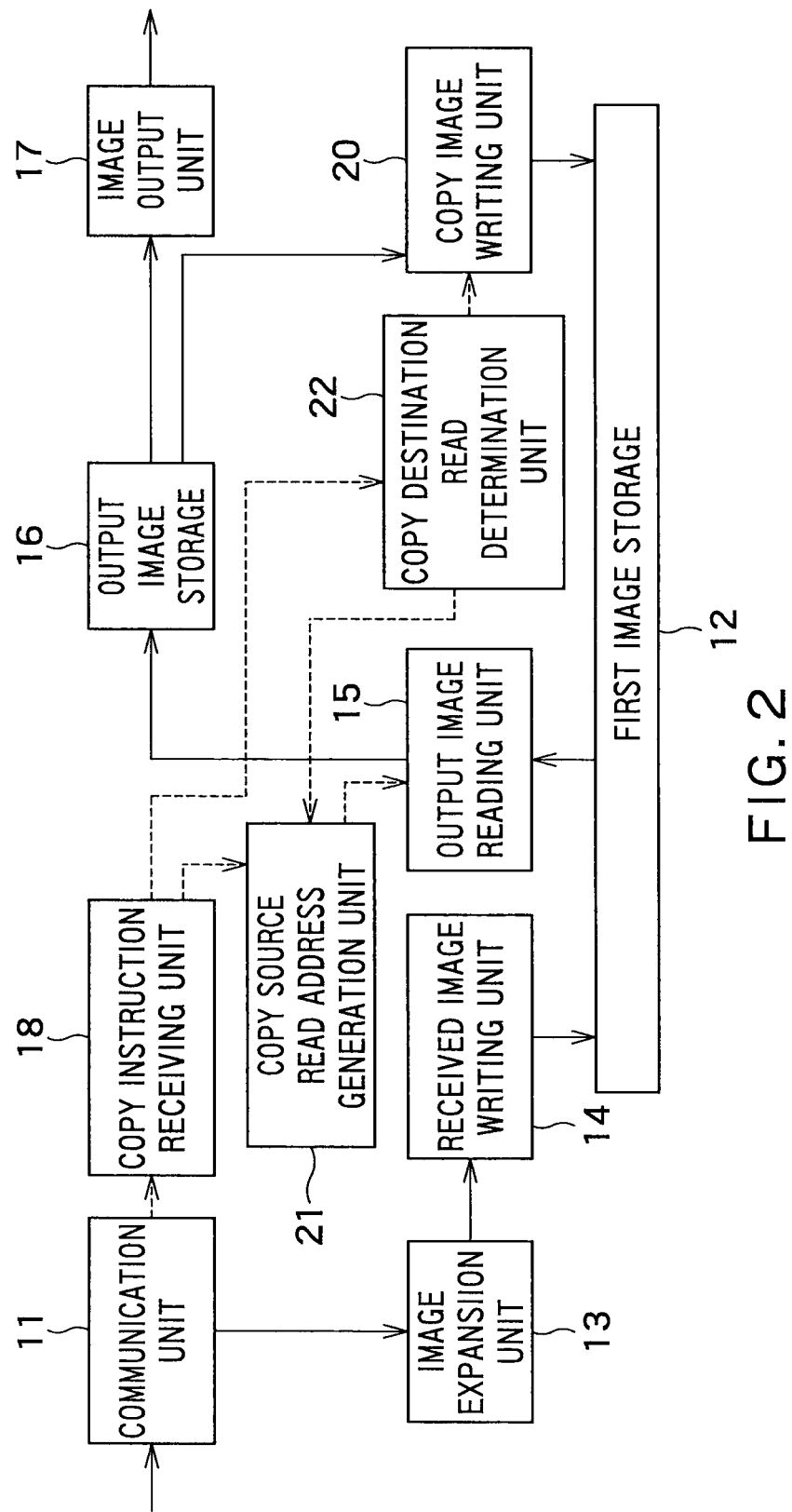
FIG. 2 is a block diagram showing an image processing apparatus as a second embodiment according to the present invention.

FIG. 2 shows a second embodiment according to the present invention. FIG. 2 is different from FIG. 1 in that instead of the copy source read determination unit 19, a copy destination read determination unit 22 is provided and a copy source read address generation unit 21 is provided. The other portions in FIG. 2 are the same as those in FIG. 1.

Figure 10:
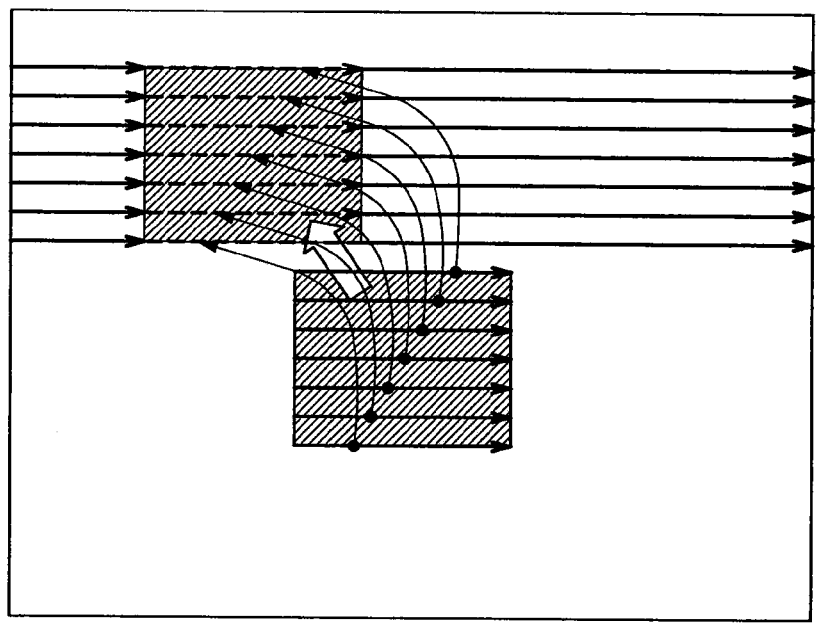
FIG. 10 is a figure showing a state in which when a copy destination area is read in the case of FIG. 9, an image is read from an area corresponding to a copy source area.

The copy destination read determination unit 22 determines on the basis of the copy instruction information whether or not the address of an image to be read by the output image reading unit 15 is included in the address of a copy destination area. When it is determined by the copy destination read determination unit 22 that the address of the image to be read by the output image reading unit 15 is included in the address of the copy destination area, the copy source read address generation unit 21 generates the read address of the copy source area on the basis of the copy instruction information, before the output image reading unit 15 reads the image. Specifically, when the output image reading unit 15 reads the copy destination area, the image of the copy source area is to be copied to the copy destination area. Therefore, the copy source read address generation unit 21 generates the read address so as to make the output image reading unit 15 capable of reading the image of the corresponding copy source area instead of reading the copy destination area as it is. FIG. 10 shows a state of the image frame. Similarly to FIG. 9, FIG. 10 shows an example in which the copy source area is shown by the hatched area in the middle of the screen, and the copy destination area is shown by the hatched area in the upper left of the screen. However, FIG. 10 shows a state where when the image reading unit 15 is intended to read the copy destination area, the image reading unit 15 is made to read an image from a corresponding area of the copy source area. Thereby, the copy source image is displayed so as to be located in the copy destination area on the screen of the display panel. Thus, in this stage, the screen after the copy processing is performed can be displayed. Further, the copy destination read determination unit 22 determines whether or not the address of the image to be read by the output image reading unit 15 is included in the address of the copy destination area, and hence the read image of the copy source area is written in the copy destination area by the copy image writing unit 20. Thereby, the copy processing is also performed. The set of the copy destination read determination unit 22 and the copy source read address generation unit 21 corresponds to, for example, an instruction unit which when image data is read from a copy destination area, instructs the output image reading unit 15 to read the image data from a copy source area instead of the copy destination area.

As described above, when reading the copy destination area, the output image reading unit 15 is made to operate to read the copy source area. Thereby, particularly when the copy destination area is located above the copy source area according to the position coordinates as shown in FIG. 9 and FIG. 10, the copy result is reflected on the screen earlier than the first embodiment, and hence the present embodiment has an advantage of improving the response.

Figure 11:
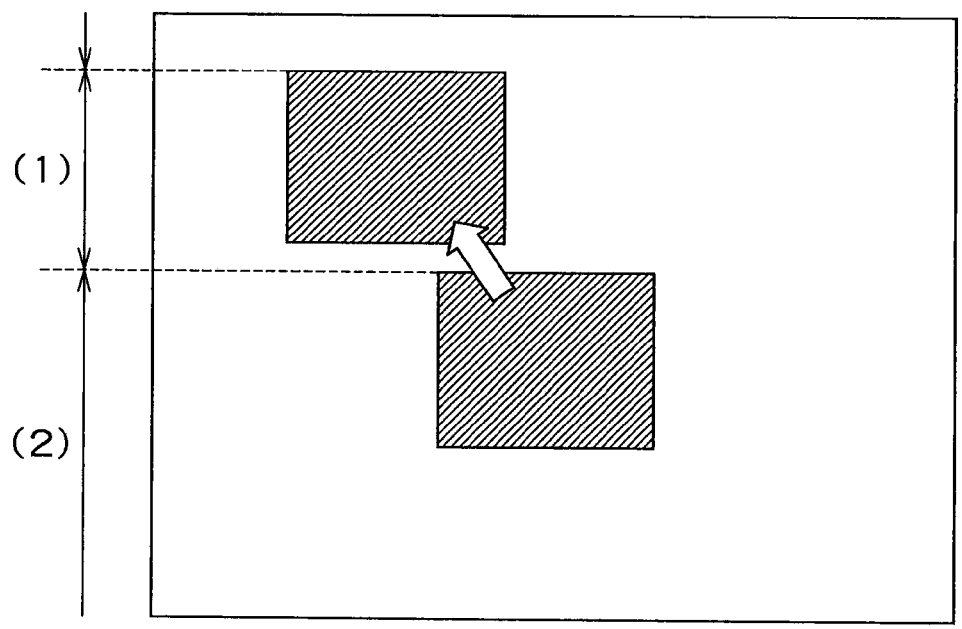
FIG. 11 is a figure for explaining a problem of the second embodiment.

Here, when the copy instruction is generated while the output image reading unit 15 is reading the area (2) in FIG. 11, the copy result is surely reflected on the screen earlier than the first embodiment. However, when the copy instruction is generated while the output image reading unit 15 is reading the area (1), the copy processing is started at the time when the reading of the present image frame is finished and when the reading of the copy destination area is started for reading the next image frame. As a result, similarly to the first embodiment, the copy is reflected on the screen at the time when the next image frame is read. Further, in the first embodiment, the copy processing itself is finished at the time when the present image frame is read, but in the second embodiment, the copy processing is not performed until the next image frame is read. Thus, there is a problem that the termination of the copy processing is delayed as compared with the first embodiment, and the subsequent processing is stagnated. Therefore, in order to avoid the problem, it may be configured such that when the output image reading unit 15 receives the copy instruction while reading the area (1) in FIG. 11, the output image reading unit 15 may not perform the operation of the second embodiment but perform the operation of the first embodiment.

Third Embodiment

Figure 12:
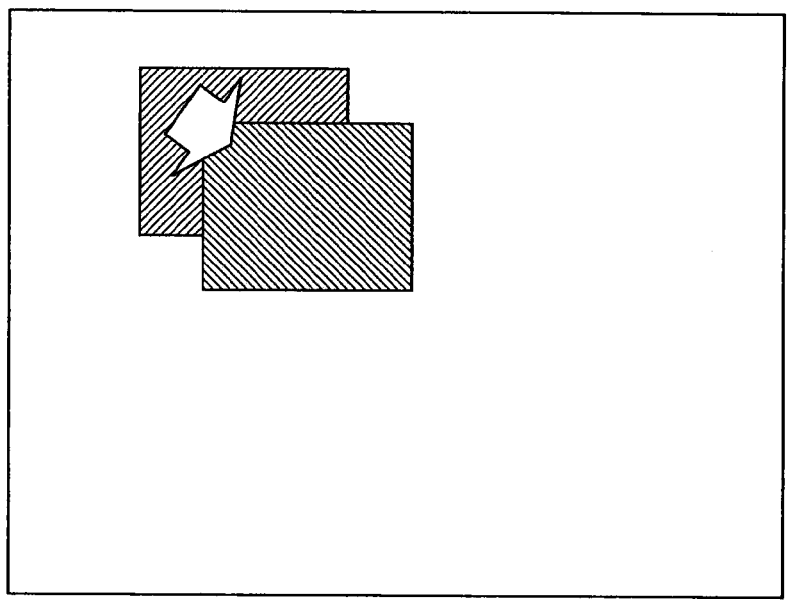
FIG. 12 is a figure showing a case where in the third embodiment, the copy destination area is located below the copy source area, and the both areas are overlapped with each other.
Figure 13:
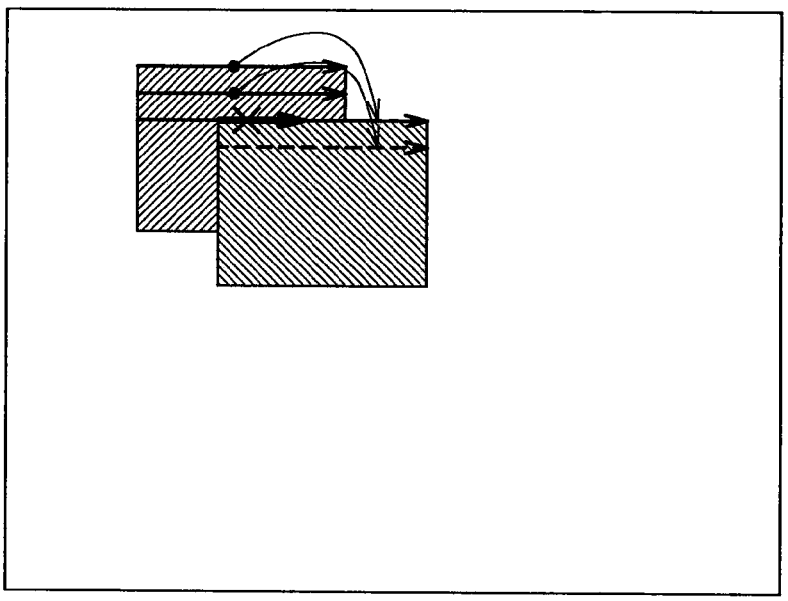
FIG. 13 is a figure for explaining a problem which may be caused in the case of FIG. 12.

The copy source area and the copy destination area may take various patterns. However, as shown in FIG. 12, when the copy destination area is located below the copy source area and when there is an overlapping area between the copy destination area and the copy source area, there occurs a problem in the first embodiment or the second embodiment. Specifically, in the case shown in FIG. 12, when the copy processing is performed in the above described manner, the copy processing is successively performed from the above as shown in FIG. 13. However, when the third line of the copy source area is intended to be read at the time of copying the third line, the third line in the copy source area is to be originally read, but the already written first line of the copy source area (the thick line portion indicated by a mark x in FIG. 13) is read, because the first line of the copy source area is written so as to overlap with the third line of the copy source area. As a result, a desired copy result cannot be obtained.

The problem is not caused in the case where the copy destination area is located above the copy source area. Thus, the problem can be avoided by successively performing the copy processing in the reversed direction from the bottom to the top. That is, the problem can be prevented in such a way that the copy source area is successively read from the bottom and is successively written in the copy destination area from the bottom. However, in the present invention, the copy processing is performed by utilizing the reading of an output image, and hence it is not possible to change the reading sequence so as to successively read the image from the bottom. Therefore, the problem needs to be avoided by another method. The method is performed according to the present embodiment.

Figure 3:
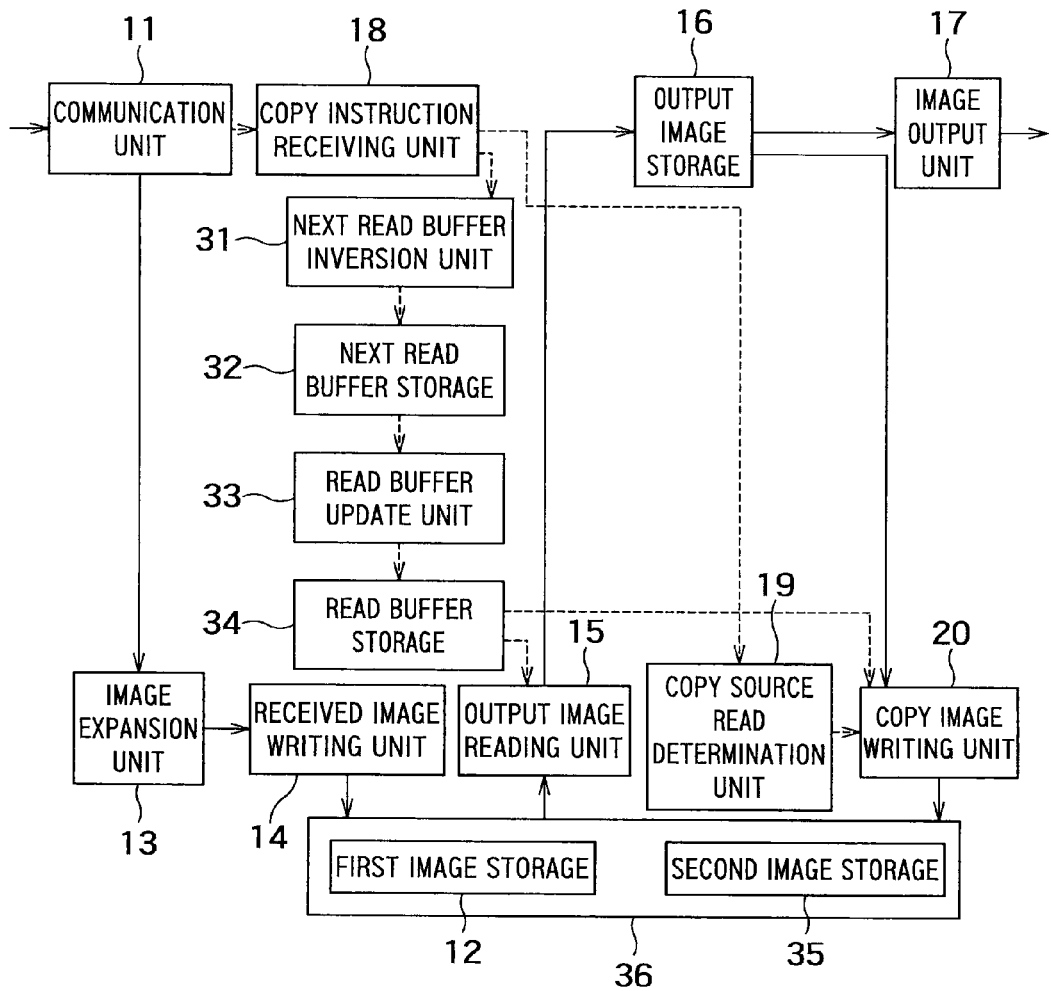
FIG. 3 is a block diagram showing an image processing apparatus as a third embodiment according to the present invention.

FIG. 3 shows a third embodiment according to the present invention. FIG. 3 is different from FIG. 1 in that a next read buffer inversion unit 31, a next read buffer storage 32, a read buffer update unit 33, and a read buffer storage 34 are provided, and further in that a second image storage 35 is provided in addition to the first image storage 12 for storing an image frame. The other portions in FIG. 3 are the same as those in FIG. 1. The first image storage 12 and the second image storage 35 are included in an image storage apparatus 36.

The read buffer storage 34 holds, for each image frame area (for example, for each pixel), buffer selection information on whether or not the output image reading unit 15 performs the reading from the first image storage 12 or the second image storage 35. When the reading of the present image frame by the output image reading unit 15 is finished and when the next image frame is to be read, the next read buffer storage 32 holds, for the each image frame area, buffer selection information on whether or not the output image reading unit 15 performs the reading from the first image storage 12 or the second image storage 35. In the period from when the reading of the present image frame by the output image reading unit 15 is finished to when the next image frame is read, the read buffer update unit 33 updates the information in the read buffer storage 34 according to the information in the next read buffer storage 32. When the copy processing is performed, the next read buffer inversion unit 31 inverts the read buffer selection information of the copy destination area which information is stored in the next read buffer storage 32.

Figure 6:
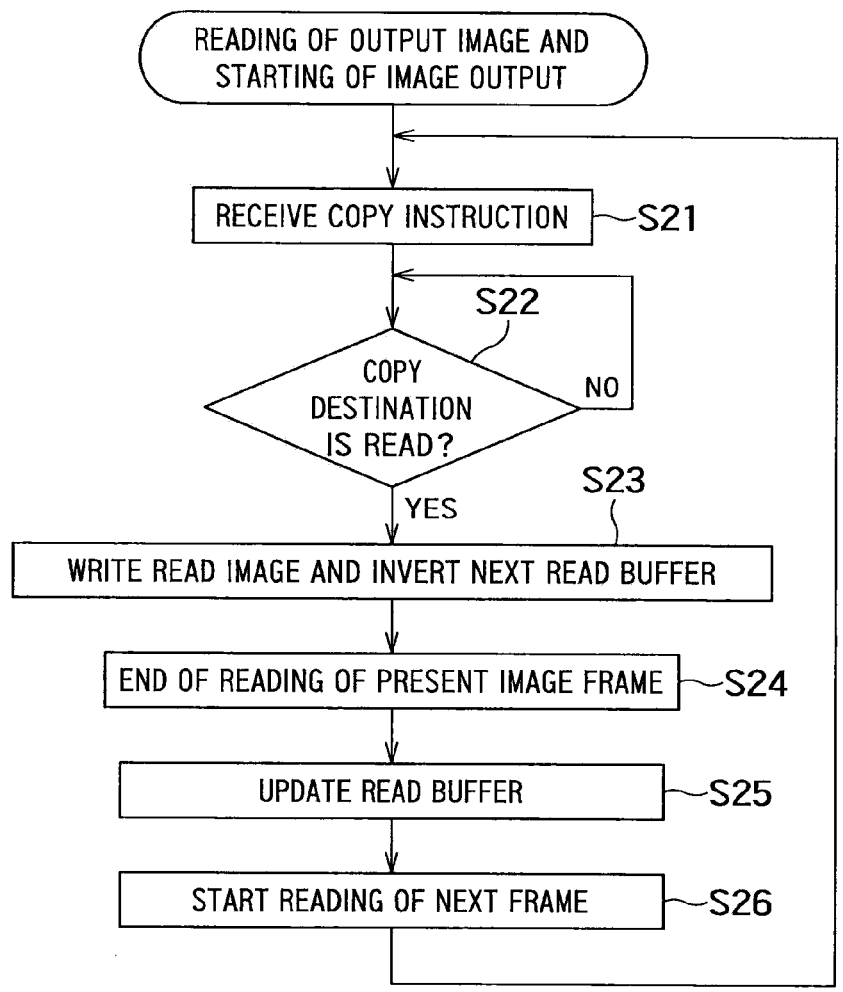
FIG. 6 is a flow chart showing a flow of specific processing relating to the copy processing in the third embodiment.
Figure 14:
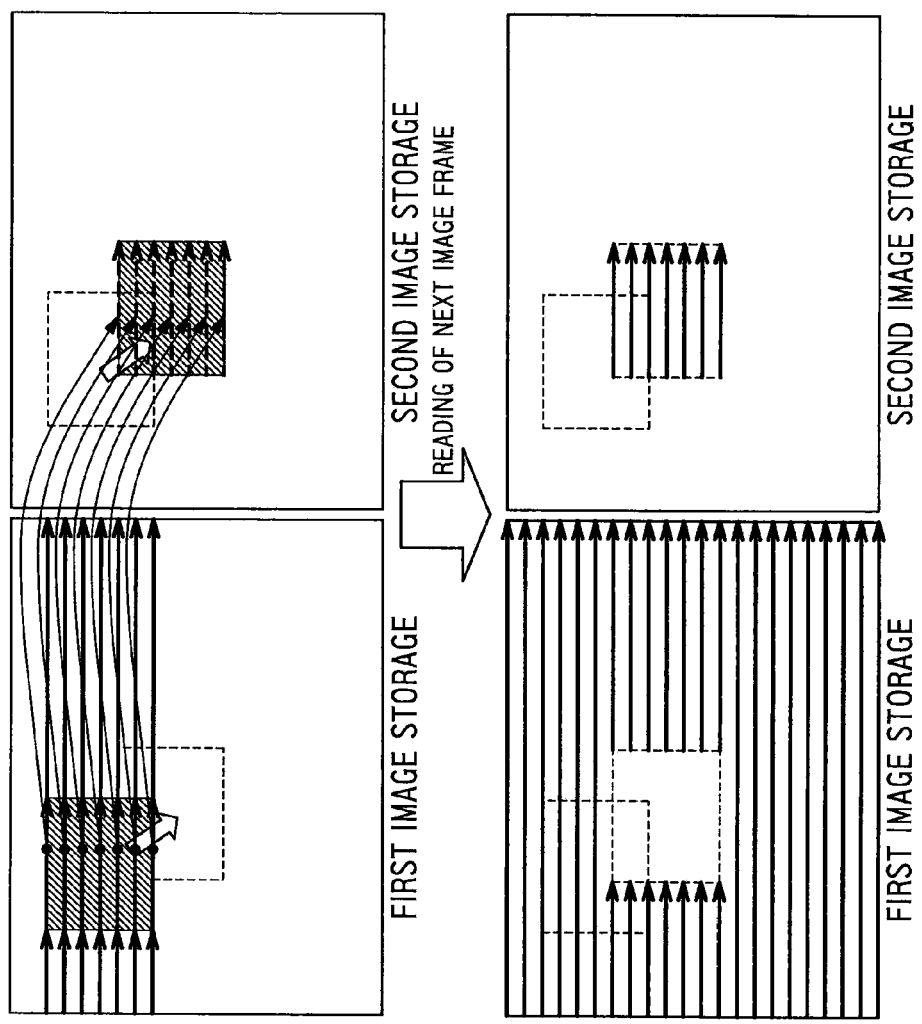
FIG. 14 is a figure showing a fundamental case where the copy processing is performed by the third embodiment.

FIG. 6 shows a flow chart of specific processing relating to the copy processing. FIG. 14 shows a fundamental case where the copy processing is performed according to the present embodiment. First, the output image reading unit 15 reads an image frame. However, at this time, on the basis of the information of the read buffer storage 34, the output image reading unit 15 selects, for each area of the image frame, whether the area of the image frame is read from the first image storage 12 or the second image storage 35. In this stage, it is assumed that the information that all areas are to be read from the first image storage 12 is stored in both the read buffer storage 34 and the next read buffer storage 32. According to the information, when the output image reading unit 15 reads an image from the first image storage 12 as shown in FIG. 14, and when the output image reading unit 15 reads the copy source (the hatched area of the first image storage 12 in the figure) similarly to the above described embodiments (YES in step S21 and step S22), the copy source read determination unit 19 determines that the copy source image is read by the output image reading unit 15, and the copy image writing unit 20 performs the writing of the read copy source image (step S23). However, the copy image writing unit 20 selects the buffer other than the buffer from which the copy source image is read, on the basis of the read buffer information of the read buffer storage 34, and writes the read copy source image in the selected buffer. In the present stage, the first image storage 12 is indicated as the read buffer for all the area, and hence as shown in FIG. 14, the read copy source image is written in the corresponding area of the second image storage 35 (the hatched area of the second image storage in the figure). According to the writing operation, the next read buffer inversion unit 31 inverts the buffer information of the copy destination area of the next read buffer storage 32 (step S23). The copy processing is performed at this stage, but the copy result is not yet reflected on the output screen. Next, when the output image reading unit 15 finishes the reading of the present image frame (step S24) and starts the reading of the next image frame, the read buffer update unit 33 updates the information of the read buffer storage 34 on the basis of the information of the next read buffer storage 32 (step S25). Specifically, the information of the read buffer storage 34 is updated so that the area of the second image storage 35 which area is written beforehand by the copy image writing unit 20 is inverted. Thereby, when reading the next image frame, the output image reading unit 15 is made to read from the second image storage 35 only the area written beforehand by the copy image writing unit 20, as shown in the lower portion of FIG. 14, and to read the other areas from the first image storage 12 (step S26). With such operation, the copy result is made to be reflected on the output screen.

The specific data structure of the read buffer storage 34 is configured, for example, like a two-dimensional bit map. When it is assumed that the size of the screen is an XGA size (1024×768), the data structure becomes, for example, a bit map information of 1024×768. Each bit corresponds to one pixel of the screen. The bit value of 0 means that the first image storage 12 is used as the read buffer, while the value of 1 means that the second image storage 35 is used as the read buffer. When reading each pixel, the output image reading unit 15 refers to the corresponding bit, and reads the pixel from the image storage indicated by the read bit. When writing each pixel, the copy image writing unit 20 refers to the corresponding bit, and writes the pixel in the image storage other than the image storage indicated by the read bit. Similarly, the next read buffer storage 32 also stores the bit information on from which buffer each pixel is read at the time of reading the next image frame. The next read buffer inversion unit 31 sets the value obtained by inverting the value of the corresponding bit of the read buffer storage 34 to the corresponding bit of the next read buffer storage 32. The read buffer update unit 33 copies all the bit information of the next read buffer storage 32 to the read buffer storage 34. With such processing, the above described embodiment can be easily realized.

Note that the above is a mere example. As another example, the next read buffer storage 32 may be configured such that in the reading of the next image frame, the bit corresponding to the pixel to be read from the image storage which is different from the present image storage is set to 1, and that the bit corresponding to the pixel to be read from the same present image storage is set to 0. In this case, the next read buffer inversion unit 31 performs processing to simply set the corresponding bit of the next read buffer storage 32 to 1. Also, the read buffer update unit 33 performs processing in such a manner that each bit of the read buffer storage 34 is inverted at the time when the corresponding bit of the next read buffer storage 32 is set to 1, and that each bit of the read buffer storage 34 is left as it is at the time when the corresponding bit of the next read buffer storage 32 is set to 0.

In the above, there is shown an example in which one bit corresponds to one pixel, but this is also a mere example. Further, in order to reduce the bit amount, it may be configured such that one bit corresponds to 16×16 pixels.

Figure 15:
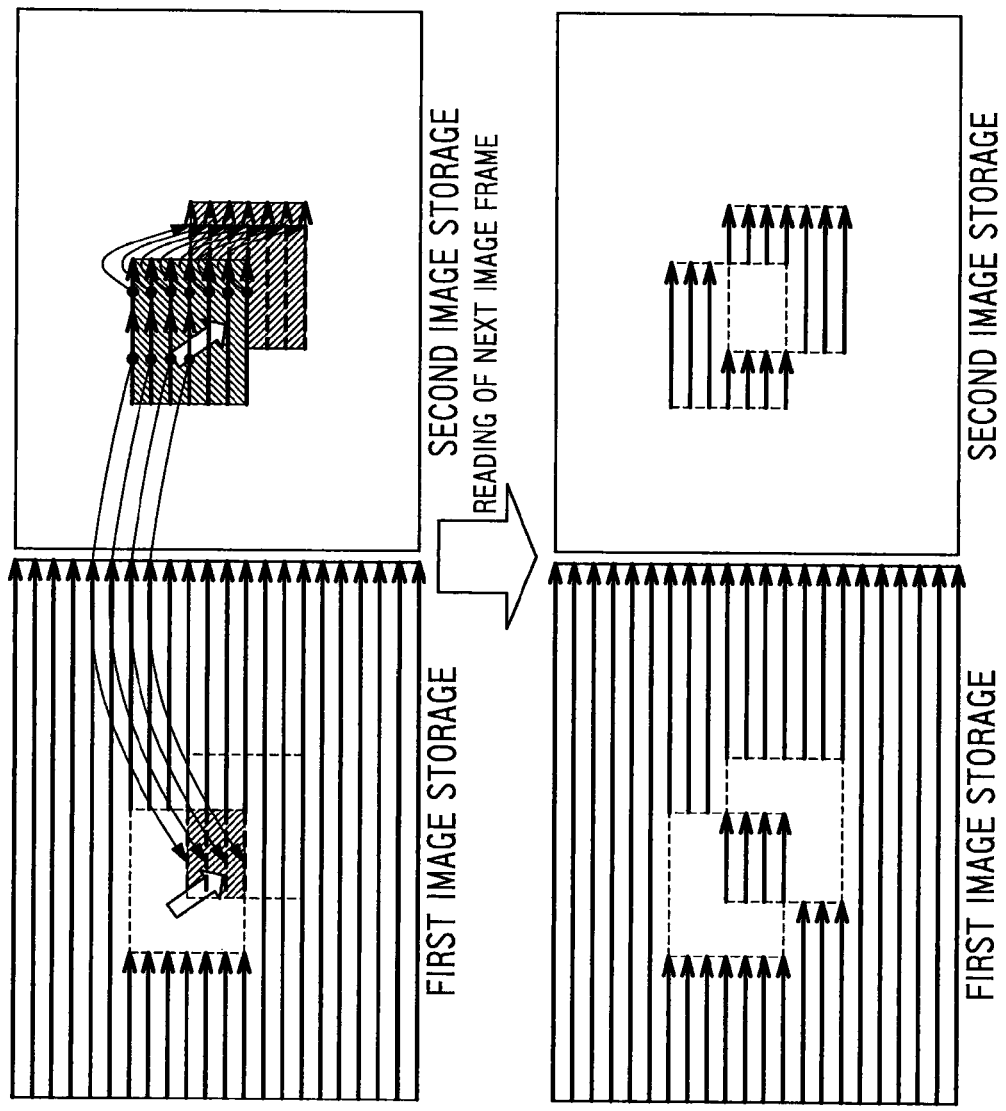
FIG. 15 is a figure showing a case where the copy processing is further performed from the state shown in the lower part of FIG. 14.
Figure 16:
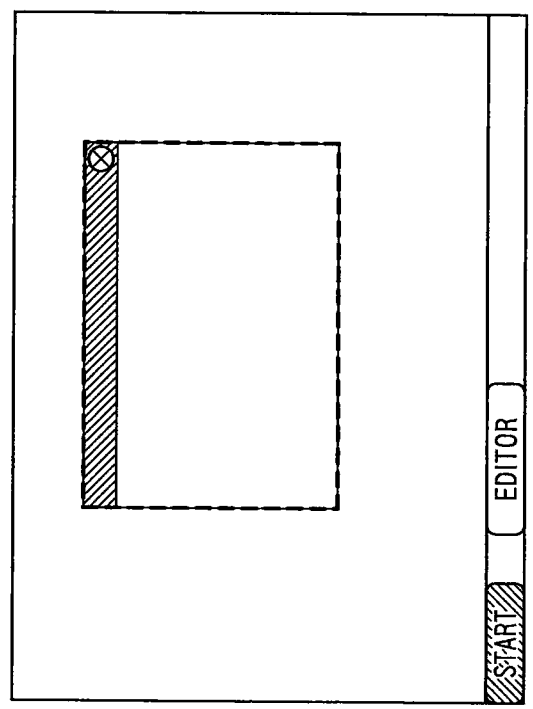
FIG. 16 is a figure showing an example in which only a partial image of an area where an update is generated in the screen is compressed and transmitted.
Figure 17:
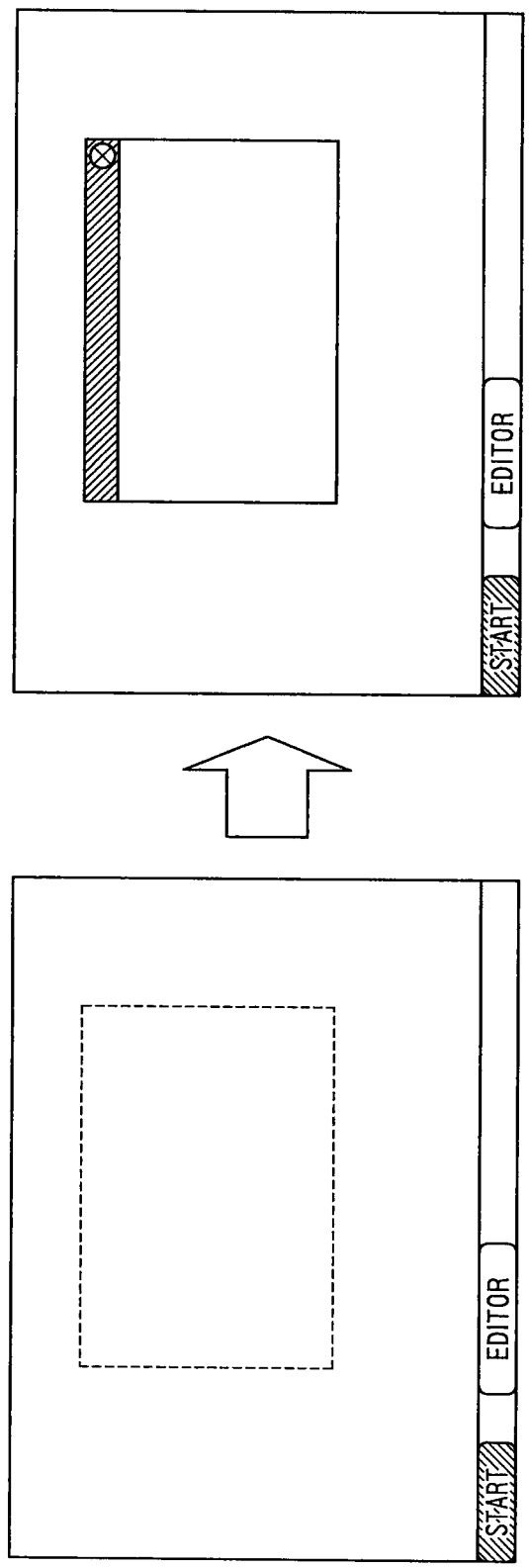
FIG. 17 is a figure showing an example in which the partial image in FIG. 16 is displayed at desired position coordinates.
Figure 18:
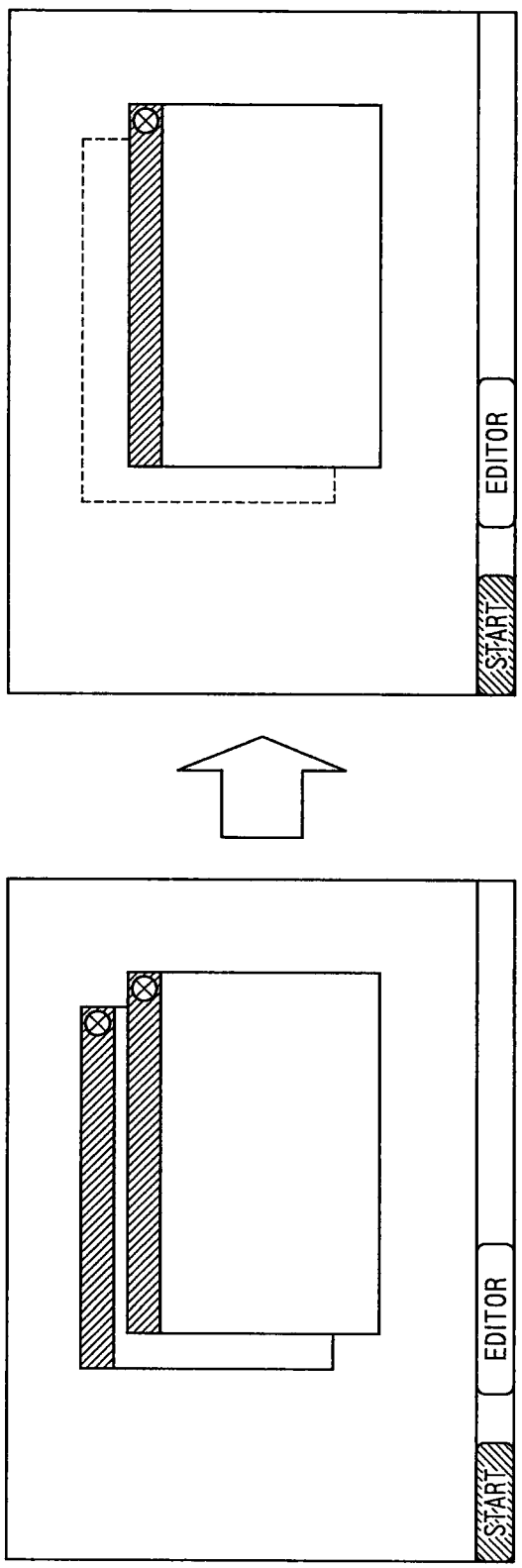
FIG. 18 is a figure showing the movement of a window.

Here, FIG. 15 shows a case where when the image frame reading is performed in the state as shown in FIG. 14, copy processing is further newly performed, and where the copy destination area is placed below the copy source area and the both areas have an overlapping area. Even in this case, the processing can be performed with no problem by the configuration as shown in FIG. 3. More specifically, FIG. 15 shows a case where after the copy processing in FIG. 14 is performed, the copy destination area is further copied in the lower portion of the figure. Of the two rectangular areas in the image frame, the upper left area is the copy source area, and the lower right area is the copy destination area. The copy processing in FIG. 15 is performed after the copy processing in FIG. 14 is performed, and hence the output image reading unit 15 reads the image of the copy source area from the second image storage 35 according to the information of the read buffer storage 34. Then, the copy source read determination unit 19 performs the determination similarly to the above described cases, and the copy image writing unit 20 writes the read image in the copy destination area. However, at this time, the copy image writing unit 20 also refers to the information in the read buffer storage 34, and writes the read image in the buffer different from the read buffer for each area of the read image. Specifically, as shown in FIG. 15, for the upper left portion of the copy destination area, the second image storage 35 is set as the read buffer, and hence the area is written in the first image storage 12. Further, for the area other than the copy destination area, the first image storage 12 is set as the read buffer, and hence the area is written in the second image storage 35. According to such operation, the next read buffer inversion unit 31 inverts the buffer information of the copy destination area in the next read buffer storage 32. At this time, the originally inverted area (the read buffer for which is set to the second image storage 35) is further inverted, so as to indicate the original first image storage 12. Then, when the output image reading unit 15 reads the next image frame, the read buffer update unit 33 updates the read buffer before the output image reading unit 15 reads the next image frame, and hence the output image reading unit 15 is enabled to suitably read the area written beforehand by the copy image writing unit 20, as shown in the lower portion in FIG. 15. With such operation, even when the cases where the copy destination area is located below the copy source area, and where the both areas have an overlapping area, are continuously generated, the operation can be performed with no problem.

However, before the output image reading unit 15 is shifted to read the next image frame, for example, when the copy processing as shown in FIG. 15 is generated after the processing of the upper portion in FIG. 14 is finished and before the processing is shifted to the lower portion in FIG. 14, the output image reading unit 15 does not read the copy source area in the reading of the image frame at this time (does not read the copy source area until the time of reading the next image frame), and hence the copy processing cannot be performed. In this case, it is necessary to wait until the output image reading unit 15 starts the reading of the next image frame.

Fourth Embodiment

Figure 4:
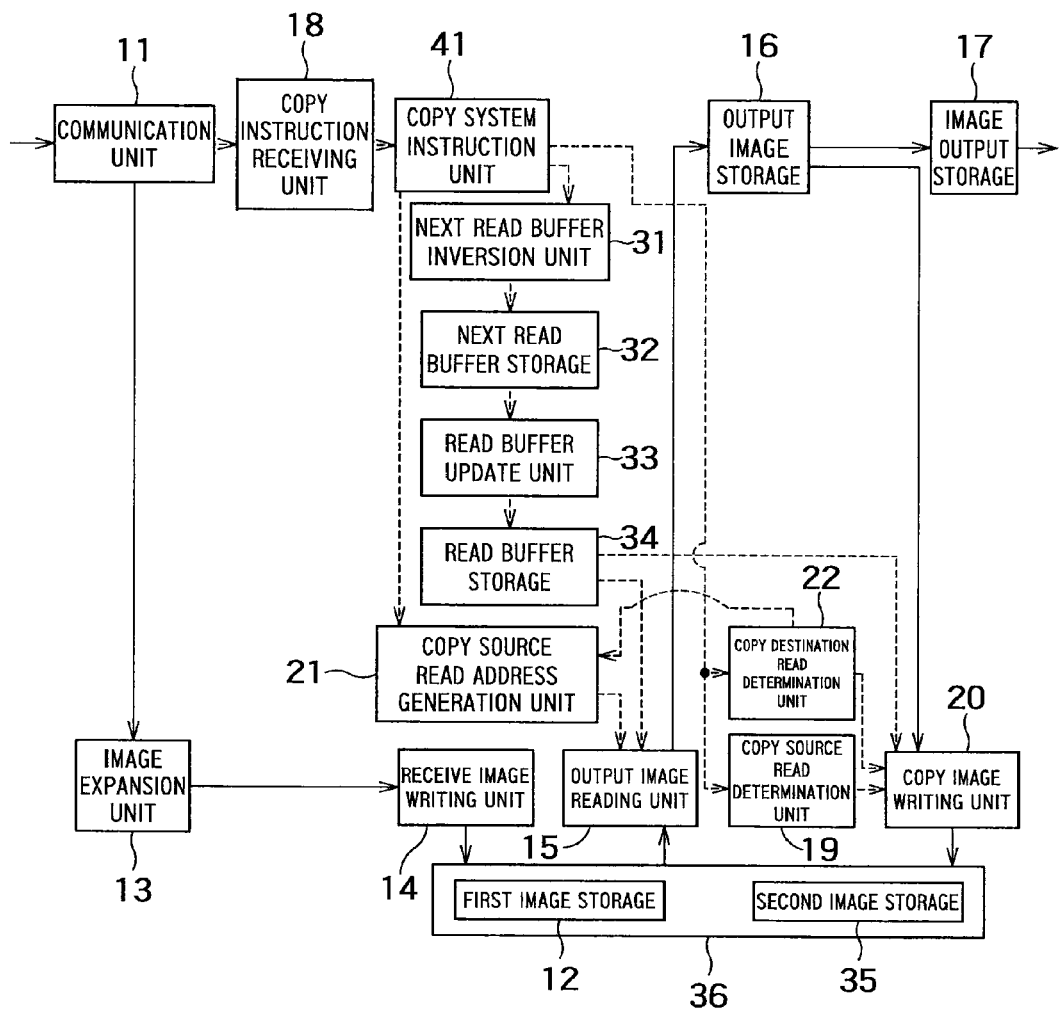
FIG. 4 is a block diagram showing an image processing apparatus as a fourth embodiment according to the present invention.

FIG. 4 shows a fourth embodiment according to the present invention. FIG. 4 shows a configuration having the functions of both the second embodiment shown in FIG. 2 and the third embodiment shown in FIG. 3, and further having a copy system instruction unit 41 configured to switch the functions. The copy system instruction unit 41 corresponds, for example, to a copy system selection unit which is configured to select a first copy system or a second copy system on the basis of a positional relationship between the copy source area and the copy destination area.

The copy system instruction unit 41 refers to the coordinates of the copy source area and the coordinates of the copy destination area, and determines whether the copy destination area is located above or below the copy source area. When the copy destination area is located below the copy source area, the copy system instruction unit 41 instructs the respective units so that the operation of the third embodiment (the first copy system) is performed. When the copy destination area is not located below the copy source area, the copy system instruction unit 41 instructs the respective units so that the operation of the second embodiment (the second copy system) is performed. Thereby, the copy processing can be performed by the optimal system in correspondence with the copy direction.

Here, in the second copy system according to the present embodiment, when reading image data, the output image reading unit 15 reads, for each area, the image data from the storage indicated by the buffer selection information in the read buffer storage 34. The copy image writing unit 20 writes, for each area, the image data read by the output image reading unit 15 in the storage indicated by the buffer selection information in the read buffer storage 34. Further, the operation of the next read buffer inversion unit 31 is stopped.

In the above description, it is assumed that when the copy destination area is below the copy source area, the operation of the third embodiment (first copy system) is performed. However, even in the case where the copy destination area is below the copy source area, when there is no overlapping area between the copy destination area and the copy source area, the above described problem is not caused even by performing the operation of the second embodiment (second copy system), and hence the operation of the second embodiment (second copy system) may be performed. That is, the copy system instruction unit 41 also refers to the size of copy area in addition to the coordinates of the copy source area and the coordinates of the copy destination area, so as to determine whether or not an overlapping area exists between the copy source area and the copy destination area. Then, when the copy destination area is below the copy source area, and when there is the overlapping area, the copy system instruction unit 41 instructs the respective units so that the operation of the third embodiment (the first copy system) is performed. Otherwise, the copy system instruction unit 41 instructs the respective units so that the operation of the second embodiment (the second copy system) is performed. Thereby, the copy system can be more surely selected. Note that in the present embodiment, the example of the second embodiment is used as the second copy system. However, the operation of the first embodiment may be used as the second copy system. The essential point of the second copy system is that the copy image writing unit performs for each area the writing processing to the storage indicated by the buffer selection information in the read buffer storage 34, and that the next read buffer inversion unit 31 stops the operation thereof.

The image processing apparatus of this embodiment may also be realized using a general-purpose computer device as basic hardware. That is, the elements within the image processing apparatus according to the above stated each embodiment can be realized by causing a processor mounted in the above described computer device to execute a program. In this case, the image processing apparatus may be realized by installing the above described program in the computer device beforehand or may be realized by storing the program in a storage medium such as a CD-ROM or distributing the above described program over a network and installing this program in the computer device as appropriate. Furthermore, the image storage within the image processing apparatus according to the above stated each embodiment may also be realized using a memory device or hard disk incorporated in or externally added to the above described computer device or a storage medium such as CD-R, CD-RW, DVD-RAM, DVD-R as appropriate.

What is claimed is:

1. An image processing apparatus comprising:
a first image storage configured to store image data of one frame;
an image receiving unit configured to receive image data on an area of all or a part of the one frame;
an image writing unit configured to write the image data received by the image receiving unit into the first image storage;
an image reading unit configured to periodically read the image data of the one frame from the first image storage in a predetermined order of address;
an image output unit configured to output the image data read by the image reading unit;
a copy instruction receiving unit configured to receive a copy instruction which specifies address information of a copy source area to be copied in the one frame in the first image storage, and which specifies address information of a copy destination area in which image data copied from the copy source area is to be placed, the copy destination area being an area in the first image storage;
a copy source read determination unit configured to judge, while the image reading unit is reading the image data of the one frame, whether a first address at which the first image storage stores the image data read by the image reading unit is included in the address information of the copy source area specified by the copy instruction; and
a copy image writing unit configured to write, when the copy source read determination unit judges that the first address is included in the address information of the copy source area specified by the copy instruction, the image data of the first address read for output by the image reading unit into the copy destination area in the first image storage at a second address which corresponds to the first address.

2. The apparatus according to claim 1, further comprising:
a second image storage configured to store image data of one frame;
a read buffer storage configured to hold buffer selection information representing, for each of areas of the one frame, whether image data is to be read from which of the first image storage or the second image storage;
a next read buffer storage configured to hold next buffer selection information representing, for each of areas of next one frame, which is a frame to be next read after the reading of the one frame is finished, whether image data is to be read from which of the first image storage or the second image storage;
a next read buffer inversion unit configured, when the copy instruction is received, to invert the next buffer selection information corresponding to the copy destination area in the next read buffer storage; and
a read buffer update unit configured, in a period after the reading of the one frame is finished and until the reading of next one frame is started, to update the buffer selection information on the basis of the next buffer selection information,
wherein the image reading unit reads the image data for each of areas of the one frame from the image storage which is indicated by the buffer selection information and
wherein the copy image writing unit writes the image data read from the copy source area into the image storage other than the image storage indicated by the buffer selection information.

3. The apparatus according to claim 2, further comprising:
a copy system selection unit configured, on the basis of address information of the copy destination area and the copy source area, to detect in the one frame whether the copy destination area is located above or below the copy source area, and configured to select a first copy system at a time when the copy destination area is located below the copy source area, and to select a second copy system at a time when the copy destination area is located above the copy source area,
wherein when the first copy system is selected, the image reading unit, the copy image writing unit, the next read buffer inversion unit and the read buffer update unit perform their operation as described in claim 2, and
wherein when the second copy system is selected, the copy image writing unit writes the image data read by the image reading unit into the image storage indicated by the buffer selection information, and the next read buffer inversion unit stops inverting the next buffer selection information.

4. The apparatus according to claim 3, wherein even when the copy destination area is located below the copy source area, the copy system selection unit selects the second copy system if the copy destination area does not overlap with the copy source area.

5. An image processing apparatus comprising:
a first image storage configured to store image data of one frame;
an image receiving unit configured to receive image data on an area of all or a part of the one frame;
an image writing unit configured to write the image data received by the image receiving unit into the first image storage;
an image reading unit configured to periodically read the image data of the one frame from the first image storage in a predetermined order of address;
an image output unit configured to output the image data read by the image reading unit;
a copy instruction receiving unit configured to receive a copy instruction which specifies address information of a copy source area to be copied in the one frame in the first image storage, and which specifies address information of a copy destination area in which image data copied from the copy source area is to be placed, the copy destination area being an area in the first image storage;
a copy destination read determination unit configured to judge, while the image reading unit is reading the image data of the one frame, whether a first address at which the first image storage stores image data to be read by the image reading unit is included in the address information of the copy destination area specified by the copy instruction;
a read address conversion instruction unit configured to instruct, when the copy destination read determination unit judges that the first address is included in the address information of the copy destination area specified by the copy instruction, the image reading unit to read image data from a second address in the copy source area which corresponds to the first address in the copy destination area, instead of reading image data from the first address in the copy destination area; and
a copy image writing unit configured to write the image data of the second address read for output by the image reading unit into the copy destination area in the first image storage at the first address.

6. An image processing method comprising:
receiving image data on an area of all or a part of one frame;
writing the received image data into a first image storage which stores image data of one frame;
periodically reading the image data of the one frame from the first image storage in a predetermined order of address;
outputting the read image data;
receiving a copy instruction which specifies address information of a copy source area to be copied in the one frame in the first image storage, and which specifies address information of a copy destination area in which image data copied from the copy source area is to be placed, the copy destination area being an area in the first image storage;
judging, while the image data of the one frame is being read, whether a first address at which the first image storage stores the image data read by the reading is included in the address information of the copy source area specified by the copy instruction; and
writing, when it is judged that the first address is included in the address information of the copy source area specified by the copy instruction, the image data of the first address read for output by the reading, into the copy destination area in the first image storage at a second address which corresponds to the first address.

7. An image processing method comprising:
receiving image data on an area of all or a part of one frame;
writing the received image data into a first image storage which stores image data of one frame;
periodically reading the image data of the one frame from the first image storage in a predetermined order of address;
outputting the read image data;
receiving a copy instruction which specifies address information of a copy source area to be copied in the one frame in the first image storage, and which specifies address information of a copy destination area in which image copied from the copy source area is to be placed, the copy destination area being an area in the first image storage;
judging, while the image data of the one frame is being read, whether a first address at which the first image storage stores image data to be read by the reading is included in the address information of the copy destination area specified by the copy instruction;
controlling, when it is judged that the first address is included in the address information of the copy destination area, to read image data from a second address in the copy source area which corresponds to the first address in the copy destination area, instead of reading image data from the first address in the copy destination area; and
writing the image data of the second address read for output by the reading, into the copy destination area in the first image storage at the first address.

8. A non-transitory computer readable medium having executable programming instructions stored thereon which, when executed by a computer, cause the computer to perform steps comprising:
receiving image data on an area of all or a part of one frame;
writing the received image data into a first image storage which stores image data of one frame;
periodically reading the image data of the one frame from the first image storage in a predetermined order of address;
outputting the read image data;

receiving a copy instruction which specifies address information of a copy source area to be copied in the one frame in the first image storage, and which specifies address information of a copy destination area in which image data copied from the copy source area is to be placed, the copy destination area being an area in the first image storage;

judging, while the image data of the one frame is being read, whether a first address at which the first image storage stores the image data read by the reading is included in the address information of the copy source area specified by the copy instruction; and writing, when it is judged that the first address is included in the address information of the copy source area specified by the copy instruction, the image data of the first address read for output by the reading, into the copy destination area in the first image storage at a second address which corresponds to the first address.

9. A non-transitory computer readable medium having executable programming instructions stored thereon which, when executed by a computer, cause the computer to perform steps comprising:

receiving image data on an area of all or a part of one frame;

writing the received image data into a first image storage which stores image data of one frame;

periodically reading the image data of the one frame from the first image storage in a predetermined order of address;

outputting the read image data;

receiving a copy instruction which specifies address information of a copy source area to be copied in the one frame in the first image storage, and which specifies address information of a copy destination area in which image copied from the copy source area is to be placed, the copy destination area being an area in the first image storage;

judging, while the image data of the one frame is being read, whether a first address at which the first image storage stores image data to be read by the reading is included in the address information of the copy destination area specified by the copy instruction;

controlling, when it is judged that the first address is included in the address information of the copy destination area, to read image data from a second address in the copy source area which corresponds to the first address in the copy destination area, instead of reading image data from the first address in the copy destination area; and writing the image data of the second address read for output by the reading, into the copy destination area in the first image storage at the first address.

* * * * *